March 27, 1956 — A. JACOBSEN — 2,739,846
CROP BLOWER

Filed Dec. 20, 1951 — 3 Sheets-Sheet 1

Inventor.
Alexander Jacobsen
By
Attorney

March 27, 1956     A. JACOBSEN     2,739,846
CROP BLOWER

Filed Dec. 20, 1951

Inventor
Alexander Jacobsen
By
Attorney

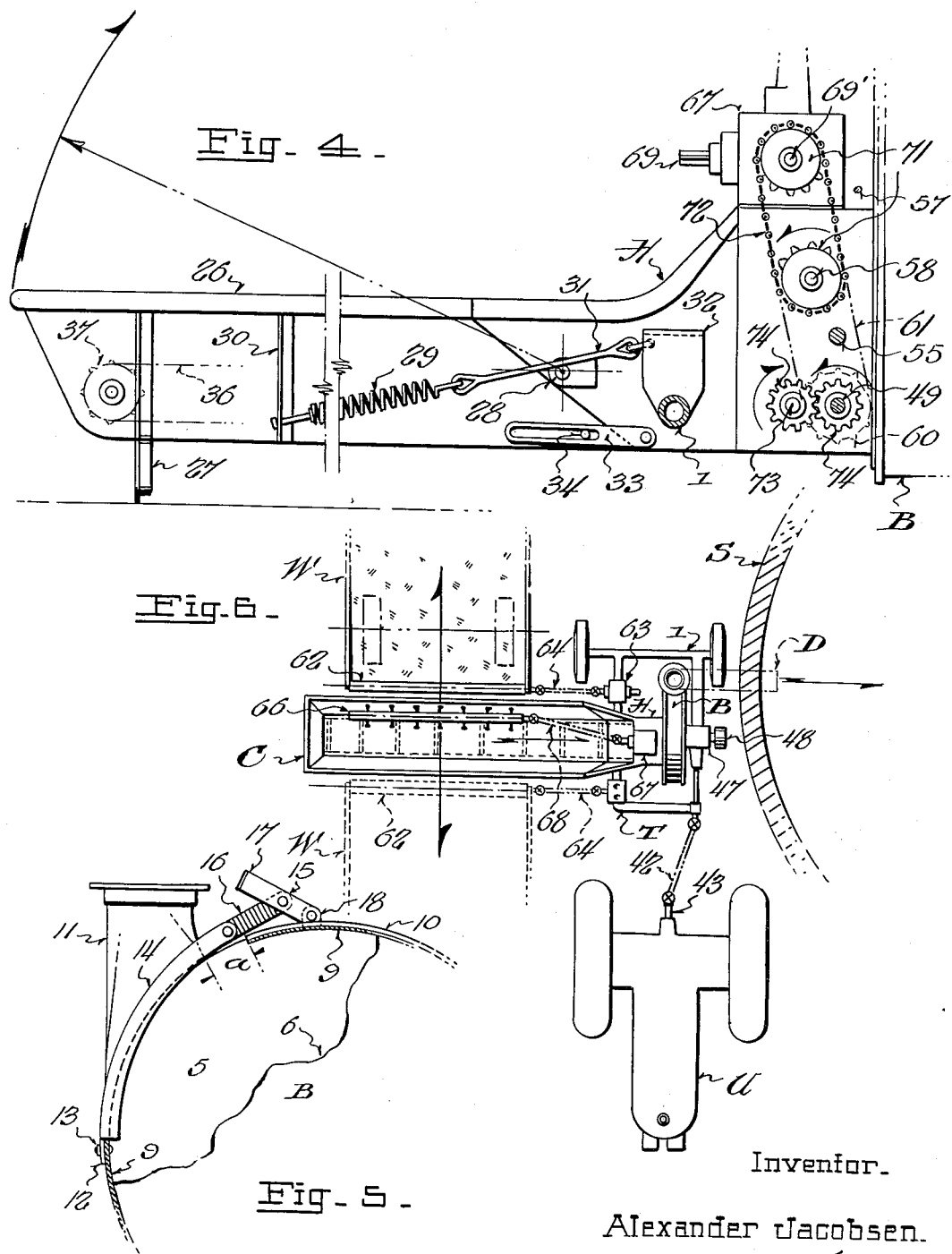

United States Patent Office 2,739,846
Patented Mar. 27, 1956

2,739,846
CROP BLOWER

Alexander Jacobsen, Appleton, Wis., assignor to Eagle Manufacturing Co., Appleton, Wis., a corporation of Wisconsin Application December 20, 1951, Serial No. 262,586

2 Claims. (Cl. 302—37)

This invention pertains to crop blowers, and more particularly to a portable unit for filling silos, storage bins, and the like from wagons equipped with forage racks and unloaders.

The primary object of the present invention resides in the provision of a comparatively simple and compact crop blower, mounted on a tractor-drawn trailer and driven directly by the power take-off shaft of the tractor, the blower and hinged receiving conveyor being so arranged that the unit can be drawn into close proximity to a silo or storage bin and permit loading of the receiving conveyor from a forage rack positioned upon either side of the conveyor.

Incidental to the foregoing, a more specific object of the invention resides in mounting the rotary blower on the trailer with its axis parallel to the trailer axle and transverse to the axis of the tractor power take-off shaft, the hinged receiving conveyor extending from one side of the trailer in a direction parallel to the trailer axle.

Another object of the invention is to provide the unit with a power take-off for operating a forage wagon unloader, as well as a power drive for a crop distributor, in the event the forage rack is equipped with the same, the unloader drive being shiftable on the unit to accommodate wagons positioned upon either side of the receiving conveyor.

Another object is to provide the receiving conveyor trough with a closed bottom to completely eliminate spillage of forage on the ground below the conveyor.

Another object is to provide a counterbalanced hinged receiving conveyor to facilitate shifting the same from horizontal to vertical position, and vice versa, during transportation and operation of the unit.

Another object resides in equipping the blower with a rotary beater traveling in the same direction as the receiving conveyor to most effectively feed forage to the blower from the conveyor.

A still further object is to provide novel means to facilitate rotatable adjustment of the blower discharge boot.

With the above and other objects in view, the invention resides in the novel features of construction fully described in the specification, and more particularly defined by the appended claims, it being understood that modifications in structure and design are contemplated within the scope of the invention.

In the drawings:

Figure 4 is a fragmentary transverse sectional view taken on the line 4—4 of Figure 1;

Figure 5 is a fragmentary side elevational view illustrating the blower discharge boot adjusting mechanism; and Figure 6 is a schematic plan view illustrating a typical operative application of the invention.

Figure 1:
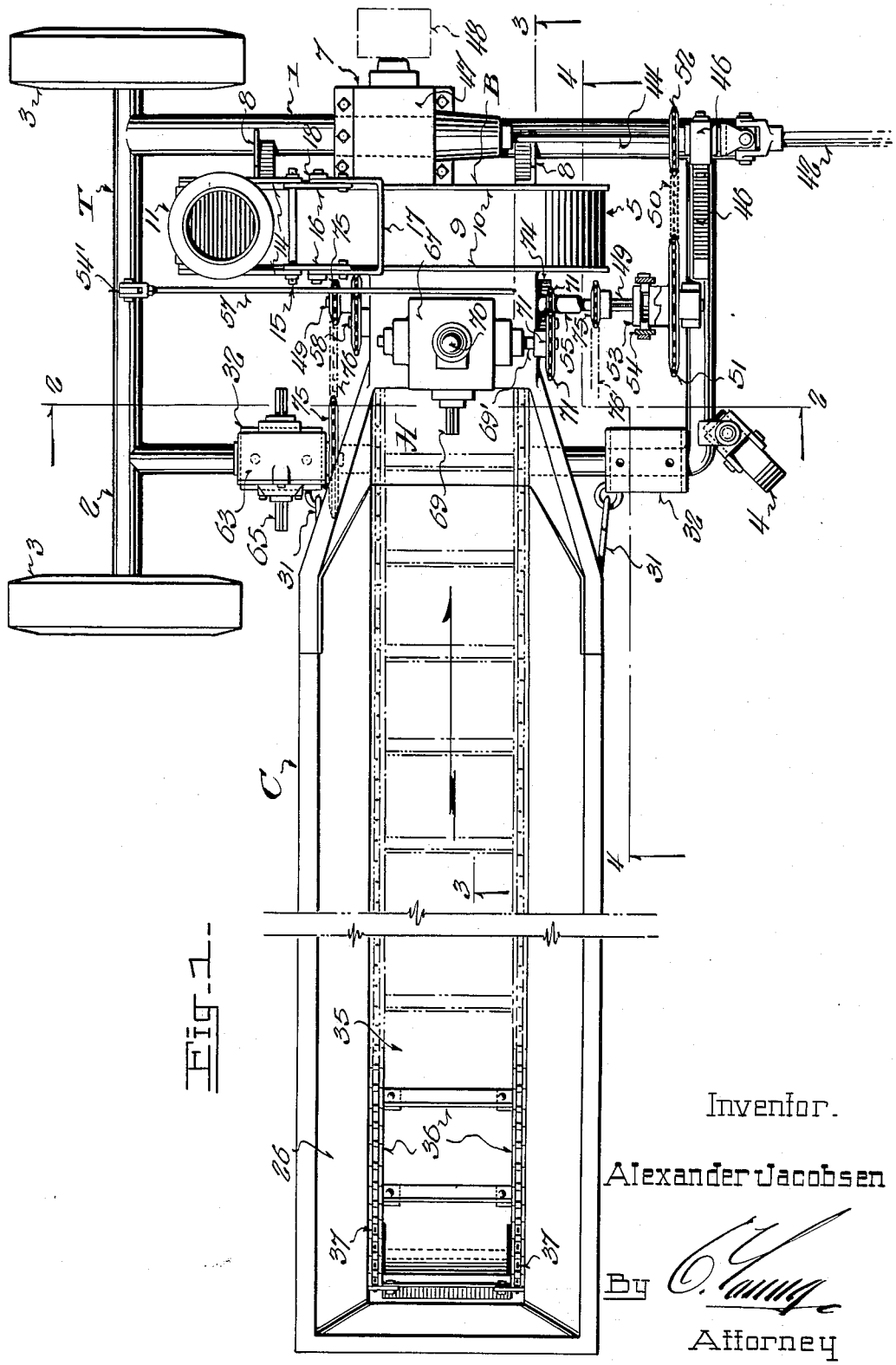
Figure 1 is a plan view of a crop blower incorporating principles of the present invention.

Referring now more particularly to the accompanying drawings, the invention as illustrated is mounted upon a trailer T, consisting of a tubular rectangular frame 1, the rear end of which constitutes an axle 2 supported upon tired wheels 3. In operation the front end of the frame is preferably supported upon a caster wheel 4, which obviously can be replaced with a jack or supporting leg of any conventional type.

Mounted on the frame 1 is a blower B in communication with a hinged crop receiving conveyor C, which may easily be raised or lowered during operation or transportation of the unit, as will be explained more in detail later on.

The blower B comprises a casing 5, including a pair of spaced stationary circular side plates 6, one of which is suitably secured to one of the side stretches of the tubular frame 1, through a bracket 7 and a pair of angle iron braces 8. The opposite wall of the casing is connected to a hopper H, which, in turn, is secured to one of the side stretches of the frame 1.

Rotatably mounted upon the peripheral edges of the side plates 6 is a split band 9 provided with channeled edges 10 for reception of the side plates. An adjustable discharge boot 11 is rigidly attached to one end of the split band 9 by a plate 12 welded or otherwise attached to the boot and secured to the band by bolts 13. A pair of arcuate straps 14 welded to the sides of the boot 11 is connected to the opposite end of the split band 9 by a toggle clamp 15, consisting of a pair of links 16 connected to a swinging yoke 17, pivotly mounted on brackets 18 attached to the channeled edges of the band 9. Obviously, the foregoing structure allows the band 9 and discharge boot 11 to be freely rotated when the band is loosened, for radial adjustment of the boot on the side plates 6 of the blower B, to attain the desired direction of delivery of the crop, as will be later explained in detail.

Mounted within the blower casing 5 is a fan or impeller 19, consisting of a hub 20, keyed or otherwise secured upon a drive shaft 21. A plurality of radial angle iron arms 22 are welded to the hub 20, and further braced by connecting straps 23. Secured to the outer ends of the arms 22 are plates 24, to which replaceable blades 25 are bolted or otherwise detachably connected.

The receiving conveyor C consists of an elongated trough 26, the outer end of which is normally supported on the ground by an angle iron yoke 27, while its inner end is hingedly connected to the hopper H through pintles 28. To facilitate raising and lowering the conveyor, as indicated by the arrow in Figure 4, the conveyor is preferably counterbalanced by springs 29, connected to braces 30 attached to the trough 26 adjacent its outer end, and tie-rods 31 connected to brackets 32 fastened to one of the tubular side stretches of the frame, upon opposite sides of the hopper. The brackets 32 serve an additional purpose to be described later. Slotted straps 33 pivotly connected to the sides of the hopper, and engaging pins 34 extending from the sides of the trough 26 adjacent its inner end, serve to retain the conveyor C in its raised inoperative position.

Positioned above the bottom of the trough 26 is a false bottom 35, over which a chain ladder conveyor 36 travels to feed the crop to the hopper H. The outer end of the chain conveyor 36 is trained over idler sprockets 37, while the inner end is mounted on driven sprockets 38. In order to drive the chain conveyor 36 in the desired direction, and simplify driving connections with the various auxiliary transmissions and feed beater 59, the sprockets 38, which carry the inner end of the conveyor, are fast on a shaft 73, journaled in the side walls of the hopper and operatively connected with the driven shaft 49 through meshing pinions 74, as best shown in Figure 4.

The front end of the frame 1 is provided with a plate 39 to which a clevis 40 is adjustably secured for attachment to a tractor draw bar 41. A splined shaft 42, universally connected to a power take-off shaft 43 of the tractor U, is also universally connected to an input shaft 44 journaled at its front end in a bearing 45, carried by braces 46 mounted on the front end of the frame. In turn, the input shaft 44 is connected to a reduction transmission 47 that drives the impeller shaft 21. If desired, the shaft 21 can extend through the transmission 47 for reception of a power take-off pulley 48, as indicated in Figure 6.

A driven shaft 49, extending through the hopper H, is operatively connected with the input shaft 44 by a chain 50 and sprockets 51 and 52, respectively, the sprocket 51 being loosely journaled on the shaft 49. To operatively connect the sprocket 51 with the shaft 49, a sliding jaw clutch 53 is splined on the shaft 49 and shifted by a hand lever 54, pivotly carried by a bar bracket 55 extending from one side of the hopper H. The manually actuated clutch lever 54 is connected by a tie-rod 57 to a similar lever 54', pivotly attached to a bracket 56 secured on the axle 2 of the frame 1, to facilitate actuation of the clutch 53 from either side of the hopper.

Figure 3:
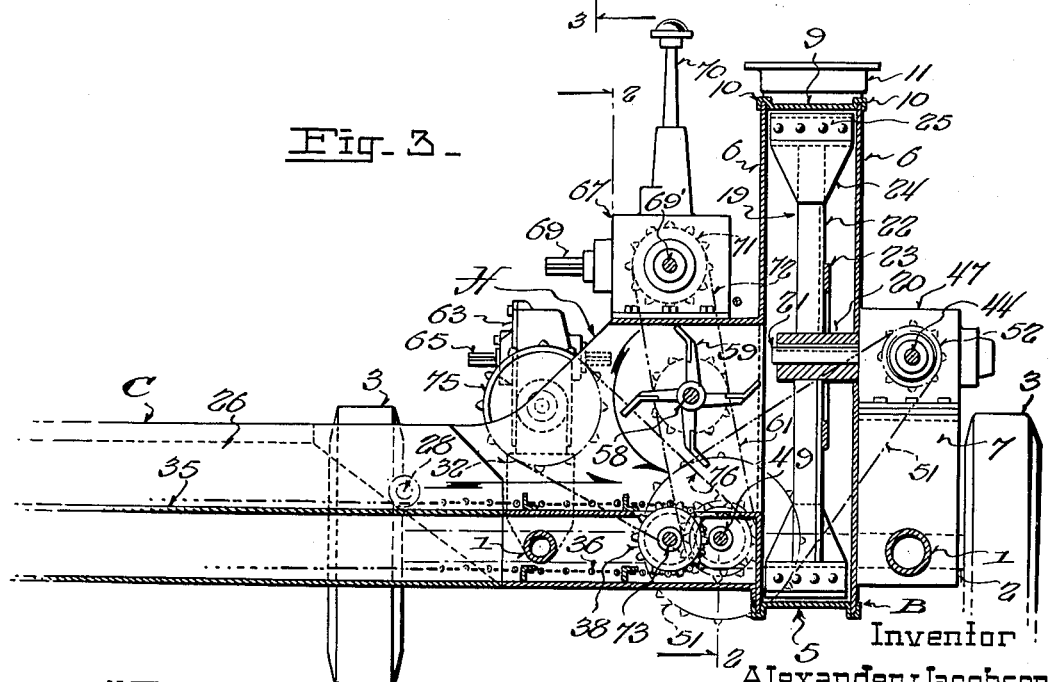
Figure 3 is a transverse fragmentary sectional view taken substantially on the lines 3—3 of Figures 1 and 2.

Journaled in the side walls of the hopper H is a shaft 58, upon which a rotary beater 59 is secured to aid in delivering the crop from the chain conveyor 36 to the blower B. The beater shaft 58 is connected with the driven shaft 49 through sprockets 60 and a chain 61. As indicated by the arrows in Figure 3, the beater 59 travels in the same direction as the chain conveyor 36.

In most instances, crop blowers of the present type are employed in filling silos or storage bins S, indicated in Figure 6, with forage delivered to the receiving conveyor C from a wagon W, equipped with a conventional unloader 62. To drive the unloader, a reduction transmission 63 is mounted on one of the brackets 32 secured on the frame 1, as heretofore explained. A splined shaft 64, universally connected with an output shaft 65 of the reduction transmission 63, is universally connected to the wagon unloader 62 to operate the same in delivering forage to the conveyor C. As shown in dotted lines in Figure 6, the wagon W may be positioned upon either side of the conveyor C, in which instance the transmission 63 is selectively mounted on one of the brackets 32 to accommodate operation of the unloader.

In some cases, the tail gates of forage wagons are provided with distributors 66 to insure uniform discharge of forage from the unloader 62 to the conveyor C. In such instances, an auxiliary transmission 67 is mounted on the top of the hopper H to operate the distributor 66 through a shaft 68 (Figure 6), universally connecting a drive shaft 69 of the auxiliary transmission 67 and the distributor 66. The auxiliary transmission 67 is controlled by a manual shift lever 70. The input shaft 69' of the auxiliary transmission 67 is driven from the beater shaft 58 through sprockets 71 and a chain 72 (Figure 4).

Operation

During transportation of the present unit by tractor or truck, the receiving conveyor C is raised to a vertical position to allow travel through any space that can be traversed by a tractor or truck. When the unit is to be used for filling a silo, as illustrated in Figure 6, the same is drawn into close proximity to the silo S without backing or turning, as required in some machines. When properly positioned, a conventional discharge stack D, indicated in dot and dash lines, is attached to the top of the blower boot 11 to deliver the crop to the silo. The splined drive shaft 42 is then connected to the power take-off of the tractor and the input shaft 44 of the unit. Depending upon which side of the receiving conveyor the crop is to be delivered to, the reduction transmission 63 is selectively mounted upon the desired bracket 32 for convenient attachment to the unloader 62 of the forage wagon W. As explained, the receiving conveyor C is normally raised, which allows the wagon W to be drawn in either direction alongside of the unit, as indicated by the arrow in Figure 6. When the wagon is properly positioned, the receiving conveyor is lowered and the shaft 64, from the reduction transmission 63, is connected to the wagon unloader 62.

Should the wagon be equipped with a distributor 66, the same is operatively connected with the auxiliary transmission 67 by means of the shaft 68, after which the unit is in condition for operation. Power is then transmitted by the tractor to the input shaft 44 to actuate the blower B, following which, drive is imparted to the shaft 49 for operating the chain conveyor 36, the reduction transmission 63, and the auxiliary transmission 67, by shifting the clutch 53 to engage the sprocket 51. Simultaneously with operation of the chain conveyor 36, the wagon unloader 62 is actuated to deliver the crop to the conveyor C, which carries the same to the beater 59 that distributes and uniformly feeds the same to the blower B.

In the event that the forage wagon is equipped with a distributor, operation of the same is independently controlled by the shift lever 70 of the auxiliary transmission 67. Likewise, operation of the chain conveyor, beater, and wagon unloader can be conveniently controlled from either side of the receiving conveyor C by the levers 54 and 54'. After a load has been delivered to the receiving conveyor, the same is easily raised because of the counterbalanced springs to permit another wagon to be drawn into delivery position.

Figure 2:
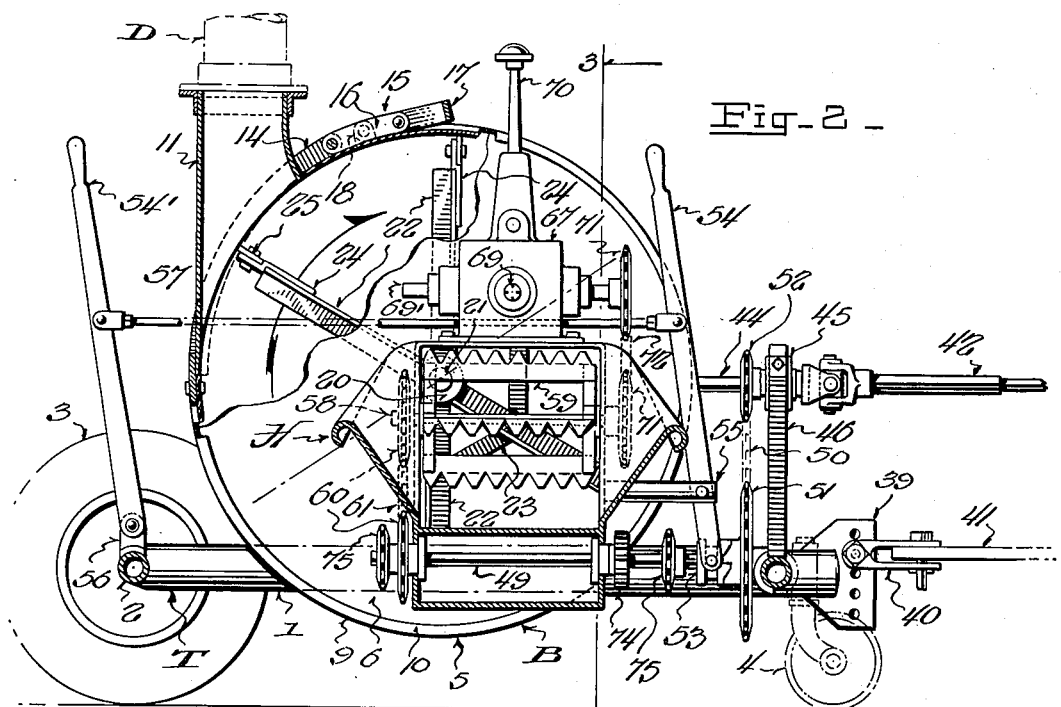
Figure 2 is a longitudinal sectional view with parts broken away, the same being taken substantially on the lines 2—2 of Figures 1 and 3.

In the drawings, the blower discharge boot 11 is positioned to receive the vertical discharge stack D for delivery of forage to the top of the silo S. However, should it be desired to change the position of the boot for discharging the crop at various angles, it is merely necessary to release the split band 9 by means of the toggle clamp 15. To accomplish this, the yoke 17 is swung over on the bracket 18 to the position shown in Figure 5, which, through the links 16 connected to the straps 14, causes the band 9 to be expanded for the distance approximating that indicated at (a), Figure 5, to release clamping pressure between the band 9 and the side plates 6 of the blower casing 5, and allow free rotation of the band and boot on the casing sides to any desired position, after which the band is again contracted and locked on the side plates by rotating the yoke 17 to the position shown in Figure 2.

Summary

From the foregoing explanation, considered in connection with the accompanying drawings, it will be apparent that a comparatively simple, compact, and efficient crop blower has been devised for easy and convenient operation, as well as transportation, by a single operator. The direct shaft driving connection between the trailer unit and the tractor power take-off eliminates the necessity of disconnecting the tractor from the unit, as now required where objectionable belt and pulley drives are employed.

A highly advantageous feature of the present invention results from the relative arrangement of the blower B and the receiving conveyor C on the trailer unit T. Heretofore, in machines of the present type, it has been customary to mount the blowers transversely on the trailer frame with the receiving conveyor necessarily mounted longitudinally on the frame, to extend forwardly or rearwardly. Obviously, such an arrangement allows the conveyor to be loaded from one side only, due to the fact that the trailer must necessarily be drawn alongside of the silo or storage bin in the manner illustrated, and consequently, it would be impossible to draw a forage wagon past the end of the trailer because of the relative position of the silo or storage bin. Inasmuch as most crop wagons unload from the rear, the foregoing arrangement necessitates backing the forage wagon to one side of the conveyor which requires an awkward and tedious undertaking.

In the present invention, mounting of the blower longitudinally on the trailer frame, with its axis parallel to the trailer axle, and extending the receiving conveyor transversely to one side of the trailer, instead of to the rear or front, the forage wagon can be drawn alongside the unit from either direction, as indicated by the arrow in Figure 6, after which the counterbalanced conveyor is easily and quickly lowered by the operator to receiving position at the rear of the wagon.

At the present time, independent auxiliary sources of power, such as electric or small gasoline motor drives, are employed for operating conventional wagon unloaders, or distributors. Inclusion of power take-off and reduction transmissions in the present unit, operatively connected with the prime source of drive, eliminates such auxiliary power units, and with respect to the wagon unloader, its operation is coordinated and simultaneously controlled with operation of the receiving conveyor, through manipulation of a single lever at either side of the receiving conveyor.

Another important advantage of the invention results from the novel means devised for quick adjustment of the blower discharge boot to deliver crops at the most desirable angle under varying circumstances. In conventional blowers, adjustment of the boot is usually accomplished through the tedious operation of removing bolts or complicated clamps, whereas in the present machine, the boot is quickly released through manipulation of the toggle yoke clamp, and freely rotated to any desired position, after which it is easily locked by manipulation of the toggle yoke.

Prolonged operation and extensive tests have established the high efficiency of the present blower rotor, in which the arms of the rotor are radially disposed to its axis, instead of tangential to the rotor hub, as is common in most conventional blowers. Also, the detachable blades allow easy removal for repair or replacement.

Lastly, applicant's receiving conveyor presents two outstanding advantages over conventional conveyors, in that the chain ladder conveyor is contained entirely within the receiving trough having a closed bottom, to prevent discharge and waste of forage such as occurs in open types of conveyors. The other advantage results from the fact that the present conveyor is counterbalanced by means of springs, which permits a single operator to easily raise and lower the same, whereas similar types of conveyors now in use, due to their length and weight, require at least two operators to raise and lower. In some instances, present receiving conveyors must be disconnected from the unit for transportation, which is avoided by the present conveyor.

I claim:

1. A crop blower comprising, an axle-supported trailer frame for connection to the draw bar of a prime mover having a power take-off, a blower mounted on said frame and having its axis parallel to said trailer axle, a hopper supported by the frame at one side of said blower, a receiving trough hinged to said hopper for vertical movement and extending transversely from said frame parallel to said trailer axle, a chain conveyor mounted in said trough and continuous across the joint between said trough and hopper for feeding crops to said hopper, a false bottom mounted above the trough bottom to support the working stretch of the chain conveyor, a rotary beater journaled in said hopper above said conveyor to feed material from the conveyor to said blower, said beater being rotated in the same direction as the direction of travel of said chain conveyor, a reduction drive transmission selectively mounted on said trailer frame upon either side of said receiving conveyor for operating a wagon unloader, a flexible drive shaft connection between said blower and the power take-off of said prime mover whereby said prime mover directly drives said blower through said shaft, and driving connections between said blower drive, receiving conveyor, rotary beater, and reduction transmission drive.

2. A crop blower comprising a frame for connection to a prime mover having a power takeoff, a blower housing having an input eye, a hopper about said eye and a conveyor trough having a pivotal connection with said hopper for swinging movement in a vertical plane, said frame being provided with paired transmission mountings at the sides of the hopper, a coupling on said frame for receiving power from the power takeoff on the prime mover, motion transmitting connections selectively connected to a transmission mounted on either of said mountings to actuate said transmission to operate a forage wagon unloader at either side of said conveyor, an auxiliary transimssion mounted on said hopper between said paired transmission mountings and substantially aligned with said conveyor, and motion transmitting connections from said power receiving coupling to said auxiliary transmission to actuate a forage wagon distributor overhanging said conveyor from either side of the conveyor.

References Cited in the file of this patent

UNITED STATES PATENTS

| | | |
|---|---|---|
| 1,490,404 | Ronning | Apr. 15, 1924 |
| 1,873,386 | Goldthwaite | Aug. 23, 1932 |
| 1,900,213 | Wenberg | Mar. 7, 1933 |
| 2,097,703 | Ronning | Nov. 2, 1937 |
| 2,116,539 | Payne | May 10, 1938 |
| 2,340,983 | Pfeiffer | Feb. 8, 1944 |
| 2,504,442 | Neighbour | Apr. 18, 1950 |
| 2,534,266 | Howe | Dec. 19, 1950 |
| 2,629,978 | Krause | Mar. 3, 1953 |
| 2,678,239 | Heth | May 11, 1954 |
| 2,698,770 | Van Sickle | Jan. 4, 1955 |